US012808982B2

(12) United States Patent
Shin

(10) Patent No.: US 12,808,982 B2
(45) Date of Patent: Nov. 24, 2026

(54) RADAR CONTROL DEVICE AND METHOD

(71) Applicant: HL KLEMOVE CORPORATION, Incheon (KR)

(72) Inventor: Jun Sik Shin, Incheon (KR)

(73) Assignee: HL KLEMOVE CORPORATION, Incheon (KR)

(*) Notice: Subject to any disclaimer, the term of this patent is extended or adjusted under 35 U.S.C. 154(b) by 70 days.

(21) Appl. No.: 18/901,650

(22) Filed: Sep. 30, 2024

(65) Prior Publication Data

US 2025/0327896 A1 Oct. 23, 2025

(30) Foreign Application Priority Data

Apr. 18, 2024 (KR) ........................ 10-2024-0051938

(51) Int. Cl.

*G01S 7/35* (2006.01)
*G01S 13/60* (2006.01)
*G01S 13/62* (2006.01)
*G01S 13/931* (2020.01)

(52) U.S. Cl.

CPC .............. *G01S 7/354* (2013.01); *G01S 13/60* (2013.01); *G01S 13/62* (2013.01); *G01S 13/931* (2013.01); *G01S 2013/9321* (2013.01)

(58) Field of Classification Search

CPC ........ G01S 13/003; G01S 13/60; G01S 13/62; G01S 13/931; G01S 2013/9321; G01S 7/354

See application file for complete search history.

(56) References Cited

U.S. PATENT DOCUMENTS

| | | | | |
|---|---|---|---|---|
| 8,077,075 | B2 * | 12/2011 | Randler | G01S 13/584 342/28 |
| 10,451,724 | B2 | 10/2019 | Shimizu | |
| 2010/0134344 | A1 * | 6/2010 | Uesato | G01S 3/46 342/156 |
| 2017/0307749 | A1 * | 10/2017 | Shimizu | G08G 1/166 |
| 2017/0363737 | A1 * | 12/2017 | Kaino | G01S 13/345 |
| 2018/0341012 | A1 * | 11/2018 | Takada | G01S 7/414 |
| 2020/0064436 | A1 * | 2/2020 | Dang | G01S 5/0294 |
| 2020/0307561 | A1 * | 10/2020 | Bush | B60W 30/09 |

(Continued)

FOREIGN PATENT DOCUMENTS

| | | |
|---|---|---|
| JP | H05256943 A | 10/1993 |
| JP | 2004239744 A | 8/2004 |
| JP | 2016075524 A | 5/2016 |

(Continued)

*Primary Examiner* — Peter M Bythrow
(74) *Attorney, Agent, or Firm* — Seed Intellectual Property Law Group LLP

(57) ABSTRACT

The present embodiments relate to a radar control device and method and device capable of transmitting a transmission signal and receiving a reception signal, generating one or more motion information by inputting the reception signal as an input value to a motion prediction model, determining each longitudinal speed information using the one or more motion information, and extracting ghost information depending on whether each longitudinal speed information is included in a specific range, thereby improving a speed control capability of a vehicle by eliminating the scattered reflection signals included in the reception signal.

16 Claims, 5 Drawing Sheets

(56) References Cited

U.S. PATENT DOCUMENTS

| | | | | |
|---|---|---|---|---|
| 2023/0258773 | A1* | 8/2023 | Akamine ................ | G01S 7/415<br>342/105 |

FOREIGN PATENT DOCUMENTS

| | | | |
|---|---|---|---|
| KR | 101348548 | B1 | 1/2014 |
| KR | 101890352 | B1 | 8/2018 |
| KR | 20210136542 | A | 11/2021 |
| KR | 10-2022-0083460 | A | 6/2022 |

* cited by examiner

RADAR CONTROL DEVICE AND METHOD

CROSS REFERENCE TO RELATED APPLICATION

This application claims priority from Korean Patent Application No. 10-2024-0051938, filed on Apr. 18, 2024, which is hereby incorporated by reference for all purposes as if fully set forth herein.

BACKGROUND

Technical Field

An embodiment of the present disclosure relates to a radar control device and a radar control method.

Description of Related Art

Recently, in the automobile industry, there is a great interest in an autonomous vehicle due to the development of information and communication technology and the increasing importance of personal leisure.

A radar device is one of the sensors that play a key role in the autonomous vehicle, and play an important role in controlling the speed and direction of the vehicle by detecting and analyzing the surrounding environment. In particular, the performance of the front radar may directly affect the safe driving and driving stability of the vehicle, and is considered a core part of autonomous driving technology.

However, the diversity and accuracy of the information detected by the radar device may be affected by various problems. In particular, since a relative speed estimation is essential for the vehicle to appropriately maintain the distance from the surrounding environment and control the speed, the accuracy of relative speed estimation is very important. Radar generally has excellent relative speed and relative distance estimation performance, but there is a concern that the estimation performance may be reduced due to diffuse reflection.

In particular, a wheel doppler ghost generated by the rotating wheels of a driving vehicle may provide a negative effect on relative speed estimation. This may occur when the received signal of the radar device collides with the rotating wheels and is diffusely reflected, which may deteriorate the relative speed estimation performance. In addition, due to the wide range of speeds that various vehicles on the road can have, the possibility of the wheel doppler ghost occurrence may increase, and it is difficult to accurately filter the wheel doppler ghost.

BRIEF SUMMARY

Embodiments of the present disclosure may provide a radar control device capable of removes the scattered reflection signals generated by the rotating wheels of a vehicle.

In addition, embodiments of the present disclosure may provide a radar control method for removing the scattered reflection signals generated by the rotating wheels of a vehicle.

In accordance with an aspect of the present disclosure, there may be provided a radar control device of a vehicle including a transceiver for transmitting a transmission signal and receiving a reception signal, a motion information predictor configured to input the reception signal as an input value to a motion prediction model to generate one or more motion information for an object, a speed determiner configured to determine each longitudinal speed information using the one or more motion information, and a motion information processor configured to extract ghost information depending on whether each longitudinal speed information is included in a specific range.

In accordance with another aspect of the present disclosure, there may be provided a radar control method of a vehicle including transmitting a transmission signal and receiving a reception signal, generating one or more motion information by inputting the reception signal as an input value to a motion prediction model, determining each longitudinal speed information using the one or more motion information, and processing the motion information by extracting ghost information depending on whether each longitudinal speed information is included in a specific range.

According to an embodiment of the present disclosure, it is possible to provide a radar control device and method capable of eliminating a ghost caused by rotating wheels of a vehicle.

DETAILED DESCRIPTION

Figure 1:
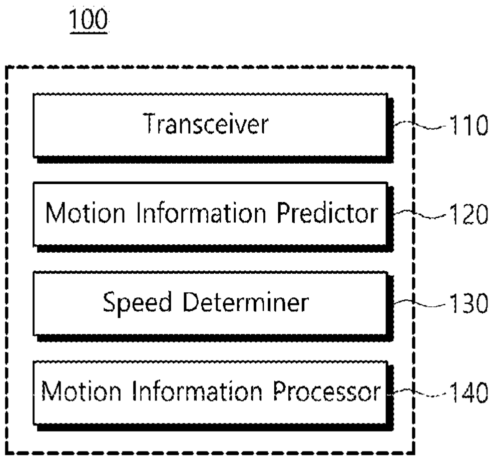
FIG. 1 illustrates a configuration of a radar control device of a vehicle according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

A radar control device in the present disclosure may be a device for controlling a radar device which receives a normal signal received by a vehicle's transmission signal being reflected by an object, or a scattered reflection signal generated by a vehicle's transmission signal being diffusely reflected by the vehicle's wheels, and removes a scattered reflection signal from the reception signal including the normal signal and the scattered reflection signal, and may mean a control unit for controlling the operation of the radar. However, the scattered reflection signal or the diffused reflection signal in the present disclosure may include not only a signal generated by being diffusely reflected by the vehicle's wheels, but also a reception signal individually received from a transmission signal of another vehicle or a signal generated from the surrounding environment, or a reception signal received by combining two or more signals. In addition, the radar device may be implemented as a frequency modulated continuous wave (FMCW) radar. However, this is only an example, and if the configuration according to the present disclosure can be applied, the present disclosure is not limited to a specific type of radar.

In addition, the radar device in the present disclosure is described with a focus on being mounted on a vehicle, but is not limited thereto, and may be applied to various radar devices such as a military radar device and a commercial radar device. In addition, the radar device of the present disclosure may include at least one vehicle radar sensor unit, for example, one or more of a front detection radar device mounted on the front of the vehicle, a rear radar device mounted on the rear of the vehicle, and a side or side-rear detection radar device mounted on each side of the vehicle.

In addition, the radar control device of the present disclosure may analyze a transmission signal and a reception signal to process data, and may generate one or more pieces of motion information about an object accordingly, and may include an electronic control unit (ECU) or a processor therefor. Data transmission or signal communication from the radar to the ECU may utilize a communication link, such as a vehicle network bus.

Hereinafter, it will be described a radar control device and method according to the present disclosure with reference to the drawings.

FIG. 1 illustrates a configuration of a radar control device of a vehicle according to an embodiment of the present disclosure.

A radar control device 100 according to an embodiment of the present disclosure may be an advance driver assistance system (ADAS) which is mounted on a vehicle and provides information to assist in driving the vehicle or assists a driver in controlling the vehicle.

Here, ADAS may mean various types of advanced driver assistance systems, and driver assistance systems may include, for example, An autonomous Emergency Braking (AEB) system, a Smart Parking Assistance System (SPAS), a Blind Spot Detection (BSD) system, an Adaptive Cruise Control (ACC) system, a Lane Departure Warning System (LDWS), a Lane Keeping Assist System (LKAS), a Lane Change Assist System (LCAS), etc. However, the present disclosure is not limited thereto.

In addition, the radar control device 100 may be applied to a manned vehicle and an autonomous vehicle in which a driver rides and controls the vehicle.

Referring to FIG. 1, a vehicle radar control device 100 according to an embodiment of the present disclosure may include a transceiver 110 which transmits a transmission signal and receives a reception signal.

For example, the transceiver 110 may include a voltage-controlled oscillator (VCO) and an oscillator which generate transmission signals by supplying signals to a plurality of transmission antennas.

As another example, the transceiver 110 may include a low noise amplifier (LNA) which amplifies a reflected signal received through a plurality of receiving antennas with low noise, a mixing unit (i.e., a mixer) which mixes a low noise amplified reception signal, an amplifier which amplifies the mixed reception signal, and a converter (e.g., an analog digital converter; ADC) which digitally converts the amplified reception signal to generate reception data.

The vehicle radar control device 100 according to embodiments of the present disclosure may include a motion information predictor 120 which inputs a reception signal as an input value to a motion prediction model to generate one or more motion information about an object.

For example, a Kalman filter or an extended Kalman filter may be used as the motion prediction model. The Kalman filter or the extended Kalman filter may be used in a system (e.g., vehicle, automated robot) that is continuously changing. The Kalman filter or the extended Kalman filter may be a filter used to estimate the motion of an object that the system will operate next in a place where the motion of the object is not reliably predicted in the system. That is, a Kalman filter or an extended Kalman filter may be used as the motion prediction model, and the motion prediction model may receive a reception signal as an input value and generate motion information predicting the motion of the object.

In addition, the Kalman filter or the extended Kalman filter may be used to remove motion information related to a scattered reflection signal or a diffuse reflection signal (e.g., noise, interference signal, ghost signal, etc.) included in the reception signal. However, the motion prediction model is not limited to this embodiment, and there may be used various filters or models capable of generating motion information and removing motion information related to a scattered reflection signal in the reflection signal.

For example, the reception signal may include information about the object. For example, the information about the object may include distance information about the object, distance change information about the object, and heading angle information of the vehicle.

As an example, the distance information about the object may mean information about a distance from the vehicle to the object. As another example, the distance change information about the object may mean the change amount of distance information per unit time. In addition, the distance change information about the object may mean relative speed information. As another example, the heading angle information of the vehicle may mean an azimuth from the radar device of the vehicle to the object. However, the information about the object is not limited to the present embodiment, and may be set in advance in various ways.

Hereinafter, for the convenience of explanation, the distance information about the object is defined as current distance information, the distance change information about the object is defined as current distance change information, and the heading angle information about the vehicle is defined as heading angle information.

As another example, one or more pieces of motion information may be generated using a motion prediction model based on the reception signal. For example, the motion information may be generated by inputting the current distance information, the current distance change information, and the heading angle information included in the reception signal into the motion prediction model.

In addition, each motion information may mean information predicted for the object using the motion prediction model (e.g., Kalman filter or extended Kalman filter) based on the reception signal. In addition, each generated motion information may include predicted distance information for the object, predicted distance change information for the object, and predicted heading angle information of the vehicle.

For the convenience of explanation, hereinafter, the predicted distance information for an object is defined as predicted distance information, the predicted distance change information for an object is defined as predicted distance change information, and the predicted heading angle information of the vehicle is defined as predicted heading angle information.

In addition, the predicted distance information, the predicted distance change information, and the predicted heading angle information differ from each other in that they are information predicted from the current distance information, current distance change information, and heading angle information, respectively, but they may include similar definitions, operations, and functions.

In addition, for the convenience of the explanation, in the explanation related to the current motion information, "generation" and "prediction" may be used interchangeably with the same meaning of "being predicted or being estimated."

As another example, the motion information may be divided into normal motion information predicted based on a normal signal directly related to the movement of an object, and diffuse motion information predicted based on a scattered reflection signal. In addition, the normal motion information and the diffuse motion information may include each of the predicted distance information, the predicted distance change information, and the predicted heading angle information.

However, the motion information is not limited to the present embodiment, and there may be included variously defined motion information. In addition, a detailed description of the motion for generating the motion information will be described later with reference to FIG. 2. Hereinafter, for the convenience of explanation, the embodiments of the present disclosure will be described using the aforementioned meanings of the normal motion information and the diffuse motion information.

Meanwhile, the vehicle radar control device 100 according to the present disclosure may include a speed determiner 130 which determines each longitudinal speed information using one or more pieces of motion information.

For example, the one or more motion information may include predicted distance information, predicted distance change information, and predicted heading angle information of each of normal motion information and diffuse motion information. A scatter diagram of the predicted distance change information may include predicted distance change information of normal motion information and predicted distance change information of diffuse motion information. In addition, the predicted distance change information of normal motion information and predicted distance change information of diffuse motion information may be distinguished using the scatter diagram of the predicted distance change information. Accordingly, the motion information may be clearly distinguished into normal motion information and diffuse motion information.

However, the scatter diagram of the predicted distance change information may not be appropriate for distinguishing motion information related to an object with a relatively wide reflective surface. For example, the one or more motion information may be generated based on a reception signal received from an object with a wide reflective surface. In this case, the predicted distance change information of the normal motion information and the predicted distance change information of the diffuse motion information may be difficult to distinguish since their respective arrangements are mixed within the predicted distance change distribution.

However, the normal motion information and the diffuse motion information are required to be distinguished for safe speed control of the vehicle under any conditions. Therefore, the speed determiner 130 may be required to determine each longitudinal speed information using the predicted distance information, the predicted distance change information, and the predicted heading angle information of the normal motion information and the diffuse motion information, respectively. In addition, the speed determiner 130 may determine the longitudinal speed information using one or more motion information, and may further determine lateral speed information, longitudinal position information, and lateral position information.

For another example, the speed determiner 130 may determine the longitudinal speed information using the predicted heading angle information of the vehicle.

For example, the predicted heading angle information x of the vehicle may be expressed as an angle based on the 12 o'clock direction of the clock. (here, x is 0° to 360°) That is, the longitudinal speed information may be determined based on the predicted distance change information, but may be determined further by using the predicted heading angle information x.

For example, the predicted distance change information may mean the predicted distance change information per unit time. That is, the predicted distance change information may mean the predicted relative speed. However, in general, the relative speed may change depending on the angle. In order to prevent problems due to the angle, the predicted distance change information is required to be generated as longitudinal speed information in which the influence of the angle may be canceled.

The speed determiner 130 may determine the longitudinal speed information by multiplying the predicted distance change information by Cos (x). For example, the longitudinal speed information may be determined by using the predicted distance change information of the normal motion information and the predicted heading angle information of the normal motion information. In addition, the longitudinal speed information may be determined using the predicted distance change information of the diffuse motion information and the predicted heading angle information of the diffuse motion information. Using the longitudinal speed information determined respectively, there may be generated a scatter diagram capable of comparing only the absolute speed values. However, the speed determination is not limited to the present embodiment, and the longitudinal speed information may be variously determined in advance and may be set to change in real time according to the movement of the vehicle.

Meanwhile, the vehicle radar control device 100 according to an embodiment of the present disclosure may include a motion information processor 140 which extracts ghost information depending on whether each longitudinal speed information is included in a preset specific range.

The motion information processor 140 may extract the ghost information using a scatter diagram of the longitudinal speed information. For example, if each longitudinal speed information is included in a preset specific range, there may be determined that the longitudinal speed information has been generated based on a normal signal included in the reception signal. In addition, if each longitudinal speed information is not included in a preset specific range, the corresponding longitudinal speed information may be determined to be ghost information generated based on a diffuse reflection signal. Hereinafter, it will be described in more detail an operation of the motion information processor 140.

For example, the specific range may be set according to a reference value set based on longitudinal speed information. In addition, the reference value may be set to a central value calculated based on longitudinal speed information. However, the reference value is not limited to the present embodiment, and may be set in advance to various values.

For another example, the specific range may be set within a threshold value set in advance based on the reference value. In addition, the threshold value may be set using a covariance calculated based on longitudinal speed information. However, the threshold value is not limited to the present embodiment, and may be set in advance to various values.

A detailed description of the operation of setting the preset specific range, reference value, and threshold value to extract the ghost information will be described in detail later with reference to FIG. 4.

For example, if the longitudinal speed information is not included in the preset specific range, the motion information processor 140 may extract the longitudinal speed information as ghost information. In addition, the motion information processor 140 may delete motion information corresponding to ghost information. The ghost information may mean motion information generated based on a scattered reflection signal and determined as longitudinal speed information through the speed determiner 130. Through this, the radar control device may more accurately predict the movement of the object. Through this, the driver of the vehicle may also smoothly control the speed of the vehicle for the object.

A detailed description of the operation of extracting and deleting ghost information of the motion information processor 140 will be described in detail later with reference to FIG. 4.

Hereinafter, there are individually described the operation of generating motion information of the vehicle radar control device, the reason for determining longitudinal speed information, and the operation of extracting ghost information. Each operation may be applied independently or may be applied in combination with each other.

Figure 2:
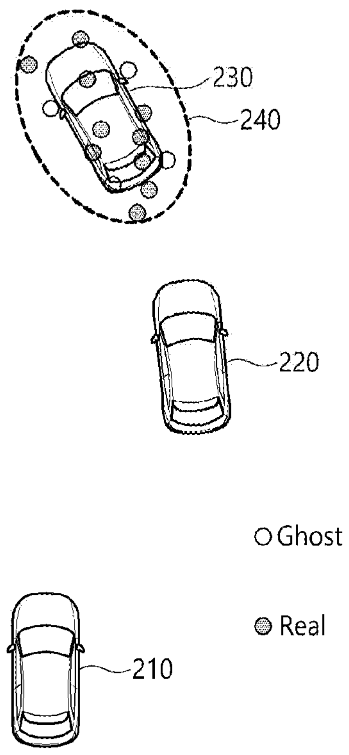
FIG. 2 illustrates an operation for generating motion information of a radar control device according to an embodiment of the present disclosure.

FIG. 2 illustrates an operation for generating motion information of a radar control device according to an embodiment of the present disclosure.

Referring to FIG. 2, one or more motion information may be generated based on a reception signal for a first object 220 for a host vehicle 210. That is, the one or more motion information may mean information generated using a motion prediction model based on a reception signal for the first object 220. In addition, referring to area 240 of FIG. 2, the one or more motion information may include diffuse motion information indicated as ‘Ghost’ and normal motion information indicated as ‘Real’. In addition, the diffuse motion information and the normal motion information may be at least one, respectively.

For example, a scattered reflection signal or a diffuse reflection signal may include all of the reception signals received individually from a wheel of the vehicle based on a transmission signal transmitted from a radar of the vehicle 210, or a signal received from a transmission signal of another vehicle or a surrounding environment, or a reception signal received by combining two or more signals. In addition, if the diffuse motion information generated using the scattered reflection signal is utilized as it is, the radar device of the vehicle 210 may be unable to properly perform an operation of detecting and analyzing the situation of the surrounding environment and controlling the speed and direction of the vehicle. Therefore, the radar control device is required to delete or remove the diffuse motion information generated based on the scattered reflection signal of the reception. Hereinafter, the diffuse motion information and the normal motion information will be described.

A first object 220 may mean a target to which the host vehicle 210 transmits a transmission signal. A second object 230 may mean a virtual object that will exist at a location where the first object 220 is predicted to move.

The diffuse motion information may be motion information generated based on the scattered reflection signal included in the reception signal. For example, the diffuse motion information may be generated based on the reception signal for the first object 220. For example, the reception signal for the first object 220 may be a reception signal received near the wheel. In this case, the motion information generated based on the corresponding reception signal may be classified as diffuse motion information. In addition, the diffuse motion information may be generated near the wheel of the second object 230. However, the present embodiment is not limited thereto, and the diffuse motion information may be generated without limitation at any location of the second object 230 as well as near the wheel of the second object 230.

As another example, the normal motion information may be generated based on the reception signal for the first object 220. For example, the reception signal for the first object 220 may be a reception signal received from a normal signal received at a location other than the wheel (e.g., front, windshield, side-mounted door, rear portion, rear glass, etc.). In this case, the motion information generated based on the corresponding reception signal may be classified as normal motion information. In addition, the corresponding normal motion information may be generated at a location other than the wheel of the second object 230.

In addition, the diffuse motion information and the normal motion information may be grouped according to whether a preset criterion is satisfied. This is so that the motion information predictor or the speed determiner determines only the motion information within the corresponding grouped area as longitudinal speed information. In addition, if the grouping is not done by area 240, there may be included unnecessary information, so that it is difficult for the radar control device to efficiently delete ghost information.

Here, the preset criterion may be set in advance based on the current distance information, current distance change information, and heading angle information included in the reception signal. For example, the preset criterion may be set based on the current distance information of the reception signal received in advance. The preset criterion may be set in the range of ±K % (wherein K is a real number greater than or equal to 0 and less than 100) based on the current distance information. As another example, the preset criterion may be set based on the current distance change information or heading angle information of the reception signal received in advance. In the present embodiment, the current distance change information or the heading angle information may be set in the range of ±A % (wherein A is a real number greater than or equal to 0 and less than 100), respectively. However, the present disclosure is not limited thereto, and the preset criterion may be set in various ways, and may be set to vary depending on the speed of the vehicle.

Figure 3:
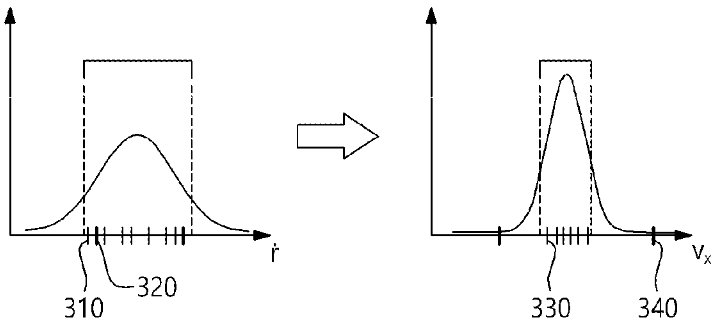
FIG. 3 is a diagram for explaining a reason for determining longitudinal speed information according to an embodiment of the present disclosure.

FIG. 3 is a diagram for explaining a reason for determining longitudinal speed information according to an embodiment of the present disclosure.

For the convenience of explanation, the motion information, diffuse motion information, and normal motion information defined in FIG. 2 are used for explanation. However, the definitions used in the embodiment may be set in advance in various ways.

Referring to FIG. 3, in a distribution diagram on the left, the horizontal axis represents the predicted distance change information and the vertical axis represents a probability. In this case, the predicted distance change information 310 of one or more normal motion information and the predicted distance change information 320 of the diffuse motion information may be arranged on the horizontal axis without any rules. In particular, the predicted distance change information 320 of the diffuse motion information may have a wider interval between the information than the predicted distance change information 310 of the normal motion information. Therefore, the distribution diagram on the left may not be appropriate for distinguishing the predicted distance change information 310 of the normal motion information and the predicted distance change information 320 of the diffuse motion information.

In a distribution on the right, the horizontal axis represents the longitudinal speed information and the vertical axis represents a probability. In this case, a first longitudinal speed information 330 determined from the predicted distance change 310 of the normal motion information and a second longitudinal speed information 340 determined from the predicted distance change information 320 of the diffuse motion information may be arranged separately. The first longitudinal speed information 330 may be arranged at relatively narrow intervals based on the center value of the distribution. The second longitudinal speed information 340 may be arranged at both ends of the distribution. Therefore, by using the distribution diagram on the right, there may be easy to distinguish the first longitudinal speed information 330 and the second longitudinal speed information 340 according to the arrangement thereof. That is, it is easy to distinguish the normal motion information and the diffuse motion information by using the distribution of the longitudinal speed information.

Figure 4:
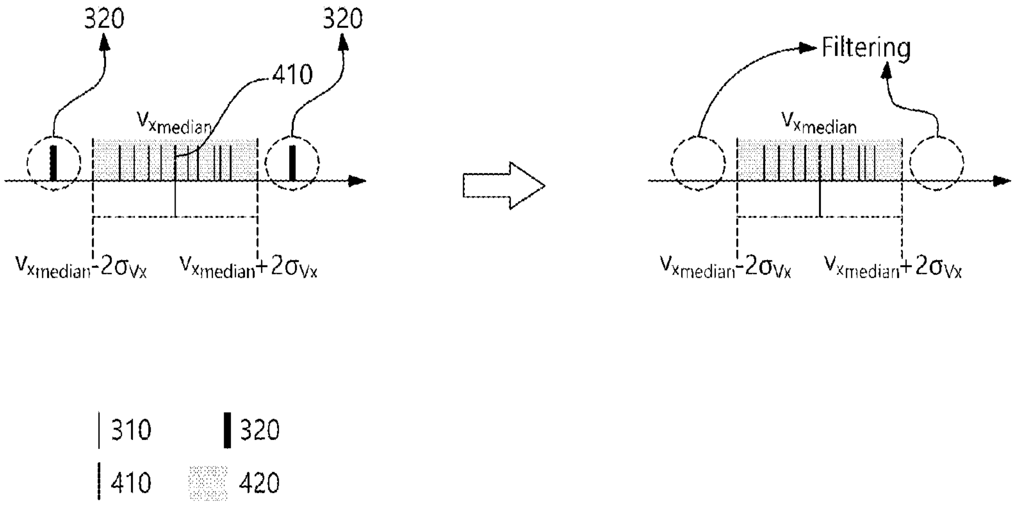
FIG. 4 is a diagram for explaining an operation for extracting ghost information of a radar control device according to one embodiment of the present disclosure.

FIG. 4 is a diagram for explaining an operation for extracting ghost information of a radar control device according to one embodiment of the present disclosure.

Referring to FIG. 4, the motion information processor may extract ghost information depending on whether each longitudinal speed information 330 and 340 is included in a preset specific range.

For example, the longitudinal speed information may include the first longitudinal speed information 330 and the second longitudinal speed information 340 as described above. In addition, the preset specific range 420 may be set according to a reference value 410 which is set based on the longitudinal speed information. In addition, the reference value 410 may be set as a central value calculated based on the longitudinal speed information.

As an example, the reference value 410 may be determined using Equations 1 and 2. N (wherein, N is an integer greater than or equal to 1) may mean the number of longitudinal speed information. The Equations 1 and 2 may be formulas for calculating the central value or a median based on the number of pieces of information.

In the case of the Equation 1, it is a formula for setting a reference value when N is an odd number. For example, if N is 3, the second longitudinal speed information from the left of the scatter diagram may be set as the reference value 410.

$$v_{x_{median}} = v_{x_{(N+1)/2}} \quad \text{[Equation 1]}$$

The Equation 2 may be a formula for setting a reference value in the case that N is an even number. For example, if N is 4, an average value of the second and third longitudinal speed information from the left of the scatter diagram may be set as the reference value 410.

$$v_{x_{median}} = 0.5 * \left(v_{x_{N/2}} + v_{x_{(N/2)+1}}\right) \quad \text{[Equation 2]}$$

That is, the reference value 410 may mean a central value or a median value set based on the number N of longitudinal speed information.

For another example, the preset specific range 420 may be set within a preset threshold value based on the reference value 410. In addition, the preset threshold value may be set using a covariance calculated based on the longitudinal speed information.

For example, the preset specific range 420 may be set within a preset threshold value on both sides based on the reference value 410 set according to the above-described method. In addition, the preset threshold value may be set by calculating a covariance value using the longitudinal speed information. Here, the covariance value may mean a value representing the correlation between each longitudinal speed information. In addition, the preset threshold value may include a positive covariance value and a negative covariance value. Referring to the scatter diagram on the left, the preset specific range 420 may be set from a range which is twice the positive covariance value calculated based on the reference value 410 to a range which is twice the negative covariance value. However, the preset specific range may be set without being limited to the preset specific range 420 of the present embodiment. In addition, the preset threshold value may include not only the covariance of the distribution but also a variance value. The threshold value may also be set in advance without being limited to the present embodiment.

In addition, referring to FIG. 4, the motion information processor may extract the longitudinal speed information 340 as ghost information if the longitudinal speed information 340 is not included in the preset specific range 420. In addition, the motion information processor may delete or remove the motion information corresponding to the ghost information.

Referring to the scatter diagram on the left, the preset specific range 420 may be set based on the reference value 410, and there is diagrammatically illustrated the inclusion relationship of the first longitudinal speed information 330 and the second longitudinal speed information 340.

The first longitudinal speed information 330 may be included in the preset specific range 420. However, the second longitudinal speed information 340 may be not included in the preset specific range 420. In this case, the motion information processor may extract the second longitudinal speed information 340 as ghost information. Hereinafter, for the convenience of description, the second longitudinal speed information 340 and the ghost information are described interchangeably.

Referring to the scatter diagram on the right, there is expressed an operation of deleting the ghost information corresponding to the second longitudinal speed information 340. In this case, the motion information processor may delete the motion information corresponding to the deleted ghost information. The ghost information may be longitudinal speed information determined based on the motion information, and since the ghost information has been deleted, there is required to also delete the motion information corresponding to the deleted ghost information.

Figure 5:
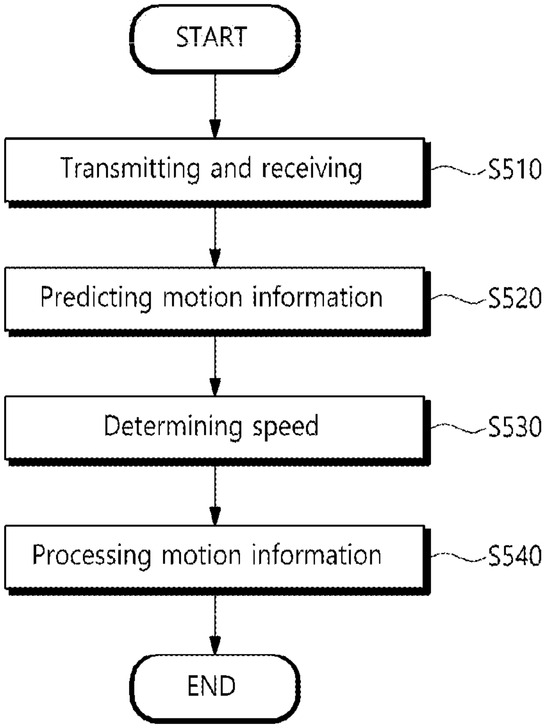
FIG. 5 is a flowchart for explaining an operation of a radar control method according to an embodiment of the present disclosure.

Referring to FIG. 5, a radar control method of a vehicle according to an embodiment of the present disclosure may include a transmission/reception step of transmitting a transmission signal and receiving a reception signal. (S510)

For example, the transmission/reception step may be performed using a voltage-controlled oscillator (VCO) and an oscillator which supply signals to a plurality of transmission antennas to generate transmission signals.

As another example, the transmission/reception step may be performed using a low noise amplifier (LNA) which low-noise amplifies a reflected signal received through a plurality of receiving antennas, a mixing unit (e.g., a mixer) for mixing a low noise amplified reception signal, an amplifier unit (e.g., an amplifier) for amplifying the mixed reception signal, and a conversion unit (e.g., an analog-to-digital converter; ADC) which digitally converts the amplified reception signal to generate reception data.

The radar control method of a vehicle according to one embodiment of the present disclosure may include a motion information prediction step of inputting a reception signal as an input value to a motion prediction model to generate one or more motion information about an object. (S520)

For example, a Kalman filter or an extended Kalman filter may be used as the motion prediction model. The Kalman filter or the extended Kalman filter may be used in a system (e.g., vehicle, automated robot) which is continuously changing. The Kalman filter or the extended Kalman filter may be a filter used to estimate the motion of an object that the system will operate next in a place where the motion of the object is not reliably predicted in the system. That is, a Kalman filter or an extended Kalman filter may be used in the motion prediction model, and the motion prediction model may receive a reception signal as an input value and generate information predicting the motion of the object.

In addition, a Kalman filter or an extended Kalman filter may be used to remove or delete motion information related to a scattered reflection signal (such as noise, interference signal, ghost signal, etc.) included in the reception signal. However, the motion prediction model is not limited to this embodiment, and there may be used various filters or models capable of generating motion information and removing motion information related to a scattered reflection signal or a diffuse reflection signal.

For example, the reception signal may include information about a measured object. For example, the information about the object may include distance information about the object, distance change information about the object, and heading angle information of the vehicle.

As an example, the distance information about the object may mean information about the distance from the vehicle to the object. As another example, the distance change information about the object may mean the change amount of distance information per unit time. In addition, the distance change information about the object may mean relative speed information. As another example, the heading angle information of the vehicle may mean an azimuth from the radar device of the vehicle to the object. However, information about the object is not limited to this embodiment, and may be set in advance in various ways.

Hereinafter, for convenience of explanation, distance information about the object is defined as current distance information, distance change information about the object is defined as current distance change information, and heading angle information of the vehicle is defined as heading angle information.

As another example, one or more motion information may be generated using a motion prediction model based on a reception signal. For example, the motion information may be generated by inputting current distance information, current distance change information, and heading angle information included in the reception signal into the motion prediction model.

In addition, each motion information may mean predicted information about the object using a motion prediction model (e.g., Kalman filter or extended Kalman filter) based on the reception signal. In addition, each generated motion information may include predicted distance information about the object, predicted distance change information about the object, and predicted heading angle information of the vehicle.

In addition, although the predicted distance information, predicted distance change information, and predicted heading angle information are different in that they are predicted information from the current distance information, current distance change information, and heading angle information, they may include similar definitions, operations, and functions.

Hereinafter, for the convenience of explanation, the predicted distance information about the object is defined as predicted distance information, the predicted distance change information about the object is defined as predicted distance change information, and the predicted heading angle information of the vehicle is defined as predicted heading angle information.

In addition, for the convenience of explanation, in the description related to the current motion information, "generation" and "prediction" may be used interchangeably with the same meaning of "being predicted or being estimated."

For another example, the motion information may be classified into normal motion information predicted based on a normal signal directly related to the movement of the object and diffuse motion information predicted based on a scattered reflection signal. In addition, the normal motion information and the diffuse motion information may include predicted distance information, predicted distance change information, and predicted heading angle information, respectively.

However, the motion information is not limited to the present embodiment, and there may be included variously defined motion information. Hereinafter, for the convenience of explanation, the embodiments of the present disclosure are described using the meanings of normal motion information and diffuse motion information as described above.

Meanwhile, the radar control method of a vehicle according to the present disclosure may include a speed determination step of determining longitudinal speed information using one or more motion information. (S530)

For example, the one or more motion information may include predicted distance information, predicted distance change information, and predicted heading angle information of each of normal motion information and diffuse motion information. A scatter diagram of the predicted distance change information may include predicted distance change information of normal motion information and predicted distance change information of diffuse motion information. In addition, the predicted distance change information of normal motion information and predicted distance change information of diffuse motion information may be distinguished using the scatter diagram of the predicted distance change information. Accordingly, the motion information may be clearly distinguished into normal motion information and diffuse motion information. However, the scatter diagram of the predicted distance change information may not be appropriate for distinguishing motion information related to an object with a relatively wide reflective surface. For example, the one or more motion information may be generated based on a reception signal received from an object with a wide reflective surface. In this case, the predicted distance change information of the normal motion information and the predicted distance change information of the diffuse motion information may be difficult to distinguish since their respective arrangements are mixed within the predicted distance change distribution.

However, the normal motion information and the diffuse motion information are required to be distinguished for safe speed control of the vehicle under any conditions. Therefore, in the speed determination step, each longitudinal speed information may be determined using the predicted distance information, the predicted distance change information, and the predicted heading angle information of the normal motion information and the diffuse motion information, respectively. In addition, in the speed determination step, the longitudinal speed information may be determined using one or more motion information, and there may be further determined lateral speed information, longitudinal position information, and lateral position information.

For another example, the speed determination step may further include determining the longitudinal speed information using the predicted heading angle information of the vehicle.

For example, the predicted heading angle information x of the vehicle may be expressed as an angle based on the 12 o'clock direction of the clock. (here, x is 0° to 360°) That is, the longitudinal speed information may be determined based on the predicted distance change information, but may be determined further by using the predicted heading angle information x. For example, the longitudinal speed information may be determined using predicted distance change information of normal motion information and predicted heading angle information of normal motion information. In addition, the longitudinal speed information may be determined using predicted distance change information of diffuse motion information and predicted heading angle information of diffuse motion information. That is, each of the longitudinal speed information may be a value obtained by multiplying the predicted distance change information by Cos (x). Using the longitudinal speed information determined respectively, there may be generated a scatter diagram capable of comparing only the absolute speed values. However, the speed determination is not limited to the present embodiment, and the longitudinal speed information may be variously determined in advance and may be set to change in real time according to the movement of the vehicle.

Meanwhile, the radar control method of the vehicle according to the present disclosure may include a motion information processing step for extracting ghost information depending on whether each longitudinal speed information is included in a preset specific range. (S540)

The motion information processing step may include extracting ghost information using a scatter diagram of the longitudinal speed information. For example, if each longitudinal speed information is included in a preset specific range, there may be determined that the corresponding longitudinal speed information is generated based on a normal signal included in a reception signal. In addition, if each longitudinal speed information is not included in a preset specific range, there may be determined that the corresponding longitudinal speed information is ghost information generated based on a scattered reflection signal. The operation of the motion information processing step will be described in more detail below.

For example, the preset specific range may be set according to a reference value set based on the longitudinal speed information. In addition, the reference value may be set to a central value calculated based on the longitudinal speed information. However, the reference value is not limited to the present embodiment, and may be set to various values in advance.

For another example, the preset specific range may be set within a preset threshold value based on a reference value. In addition, the preset threshold value may be set using a covariance calculated based on longitudinal speed information. However, the threshold value is not limited to the present embodiment, and may be set in advance to various values.

For example, the motion information processing step may include extracting the longitudinal speed information as ghost information if the longitudinal speed information is not included in the preset specific range. In addition, the motion information processing step may include deleting or removing the motion information corresponding to the ghost information. The ghost information may mean information in which the motion information generated based on the scattered reflection signal is determined as longitudinal speed information in the speed determination step. Through this, the radar control device can more accurately predict the movement of the object, and the driver of the vehicle can also smoothly control the speed of the vehicle for the object.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A radar control device of a vehicle comprising:

a transceiver for transmitting a transmission signal and receiving a reception signal;

a motion information predictor configuring to input the reception signal as an input value to a motion prediction model to generate one or more motion information for an object;

a speed determiner configuring to determine each longitudinal speed information using the one or more motion information; and a motion information processor configuring to extract ghost information depending on whether each longitudinal speed information is included in a specific range.

2. The radar control device of claim 1, wherein the speed determiner determines the longitudinal speed information using a predicted heading angle information of the vehicle.

3. The radar control device of claim 1, wherein the specific range is set according to a reference value set based on the longitudinal speed information.

4. The radar control device of claim 3, wherein the reference value is set to a central value calculated based on the longitudinal speed information.

5. The radar control device of claim 3, wherein the specific range is set to within a preset threshold value based on the reference value.

6. The radar control device of claim 5, wherein the preset threshold value is set using a covariance calculated based on the longitudinal speed information.

7. The radar control device of claim 1, wherein the motion information processor extracts the longitudinal speed information as ghost information if the longitudinal speed information is not included in the specific range.

8. The radar control device of claim 7, wherein the motion information processor deletes the motion information corresponding to the ghost information.

9. A radar control method of a vehicle comprising:

transmitting a transmission signal and receiving a reception signal;

generating one or more motion information by inputting the reception signal as an input value to a motion prediction model;

determining each longitudinal speed information using the one or more motion information; and processing the motion information by extracting ghost information depending on whether each longitudinal speed information is included in a specific range.

10. The radar control method of claim 9, wherein the determining includes converting the motion information into longitudinal speed information using a heading angle of the vehicle.

11. The radar control method of claim 9, wherein the specific range is set according to a reference value set based on the longitudinal speed information.

12. The radar control method of claim 11, wherein the reference value is set to a central value calculated based on the longitudinal speed information.

13. The radar control method of claim 11, wherein the specific range is set to within a preset threshold value based on the reference value.

14. The radar control method of claim 13, wherein the preset threshold value is set using a covariance calculated based on the longitudinal speed information.

15. The radar control method of claim 9, wherein the processing includes extracting the longitudinal speed information as ghost information if the longitudinal speed information is not included in the specific range.

16. The radar control method of claim 15, wherein the processing includes deleting the motion information corresponding to the ghost information.

* * * * *